United States Patent [19]

Kanehara et al.

[11] Patent Number: 4,537,172

[45] Date of Patent: Aug. 27, 1985

[54] FUEL SUPPLY CONTROL APPARATUS FOR AN INTERNAL-COMBUSTION ENGINE

[75] Inventors: Kenji Kanehara, Aichi; Tokio Kohama, Nishio; Hisasi Kawai, Toyohashi; Norihito Tokura, Aichi, all of Japan

[73] Assignee: Nippon Soken, Inc., Nishio, Japan

[21] Appl. No.: 544,416

[22] Filed: Oct. 21, 1983

[30] Foreign Application Priority Data

Nov. 26, 1982 [JP] Japan ................................ 57-207921

[51] Int. Cl.$^3$ ............................................. F02M 21/04
[52] U.S. Cl. ..................................... 123/527; 123/494; 123/478
[58] Field of Search ............... 123/525, 527, 552, 557, 123/538, 510, 438, 478, 480, 440, 494

[56] References Cited

U.S. PATENT DOCUMENTS

| | | | |
|---|---|---|---|
| 4,098,248 | 7/1978 | Todd | 123/527 |
| 4,259,936 | 4/1981 | Bach et al. | 123/552 |
| 4,329,963 | 5/1982 | Granger | 123/552 |
| 4,331,116 | 5/1982 | Simonds | 123/557 |
| 4,369,751 | 6/1983 | Batchelor et al. | 123/525 |
| 4,430,978 | 2/1984 | Lewis et al. | 123/527 |
| 4,441,473 | 4/1984 | Isomura et al. | 123/440 |

*Primary Examiner*—Raymond A. Nelli
*Attorney, Agent, or Firm*—Cushman, Darby & Cushman

[57] ABSTRACT

In a fuel supply control apparatus for an internal-combustion engine, liquid fuel is vaporized and is supplied to a fuel gas passage leading to an intake air passage. The flow rate of the vaporized fuel flowing through the fuel gas passage is detected, and the flow rate of the fuel is calculated in accordance with the load of the engine. As a result, feedback control of the fuel to be supplied to the engine is carried out so that the detected flow rate of the vaporized fuel is close to the calculated flow rate of the fuel.

6 Claims, 16 Drawing Figures

FUEL SUPPLY CONTROL APPARATUS FOR AN INTERNAL-COMBUSTION ENGINE

BACKGROUND OF THE INVENTION

1. Field of the Invention

The present invention relates to a fuel supply control apparatus for an internal-combustion engine which uses gas fuel such as liquefied petroleum gas (LPG) or liquefied hydrogen gas.

2. Description of the Prior Art

A prior art fuel supply control apparatus used in an internal-combustion engine using LPG comprises a carburetor and a regulator for controlling the flow rate of the fuel. In this apparatus, however, the flow of the fuel is volumetrically controlled, with the result that the air-fuel raio of the air-fuel mixture is affected by the temperature and by the density of the LPG, thereby inviting unstable air-fuel ratio control. In addition, the regulator is of a complex mechanical structure which decreases the pressure of the LPG from 4 kg/cm$^2$ to 0.3 kg/cm$^2$.

SUMMARY OF THE INVENTION

It is an object of the present invention to provide a fuel supply control apparatus for an internal-combustion engine which has excellent air-fuel ratio characteristics and is simple in structure.

According to the present invention, liquid fuel is vaporized and supplied to a fuel gas passage which leads to an intake air passage. The flow rate of the vaporized fuel flowing through the fuel gas passage is detected, and the flow rate of the fuel is calculated according to the load of the engine. Feedback control of the fuel to be supplied to the engine is carried out so that the detected flow rate of the vaporized fuel is close to the calculated flow rate of the fuel. The above-mentioned feedback control can be electrically carried out by using a microcomputer or the like. In addition, no mechanical or complex regulator is required.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 1:
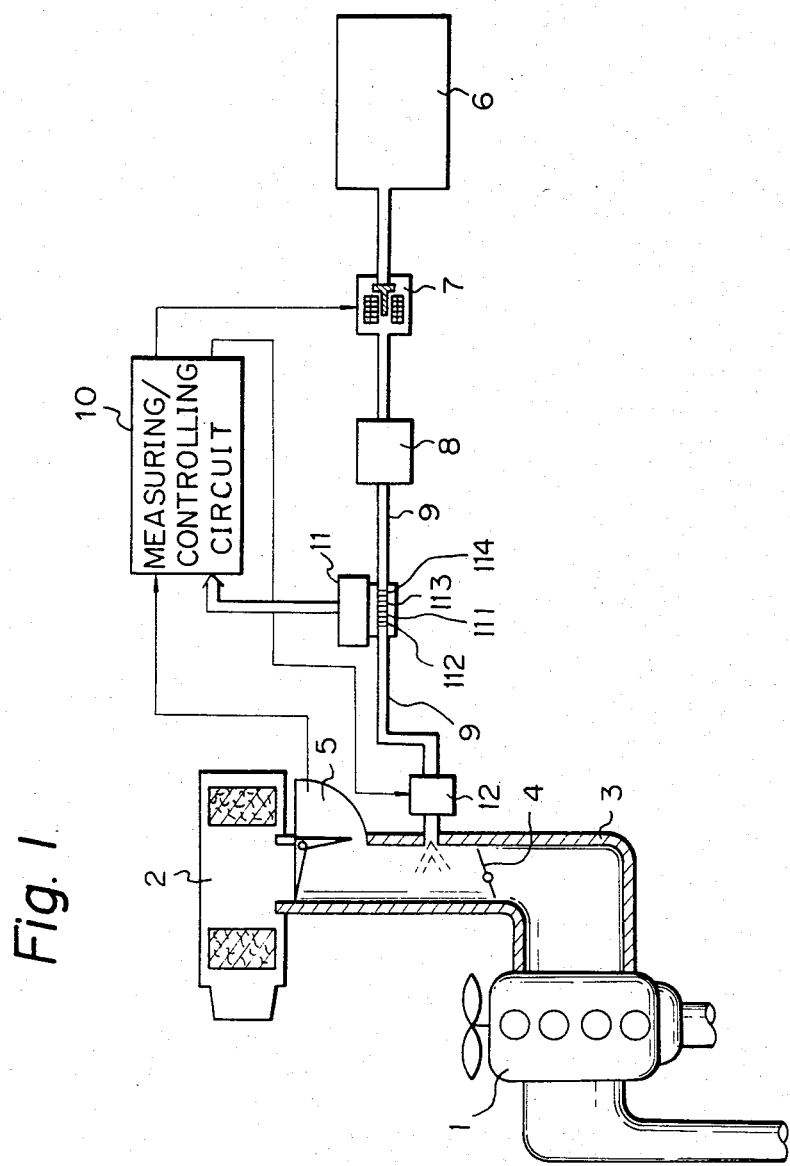
FIG. 1 is a schematic diagram illustrating an embodiment of the fuel supply control for an internal-combustion engine according to the present invention.

In FIG. 1, which illustrates an embodiment of the present invention, reference numeral 1 designates a spark ignition engine for driving an automobile in which air for combustion is sucked through an air cleaner 2 and an intake air passage 3. Provided in the intake air passage 3 is a throttle valve 4 arbitrarily operated by a driver. Also provided in the intake air passage 3 between the air cleaner 2 and the throttle valve 4 is a potentiometer-type airflow meter 5 for detecting the amount of air taken into the engine 1 so as to generate an analog voltage signal in proportion to the amount of air flowing therethrough. Reference numeral 6 designates a fuel tank for LPG, and 7 designates a switching valve which is open when the engine 1 is operating and is closed when the engine 1 is not operating or is operating in an abnormal state. The switching valve 7 is controlled by a measuring/controlling circuit 10. Reference numeral 8 designates a pressure control valve for vaporizing LPG in a liquid state and supplying the vaporized LPG into a fuel gas passage 9. The pressure control valve 8 also controls the pressure of the LPG in the fuel gas passage 9. Reference numeral 11 designates a fuel gas flow meter for detecting the amount of fuel gas flowing in the fuel gas passage 9. Provided in the intake air passage 3 on the upstream side of the throttle valve 4 leading to the fuel gas passage is a linear solenoid-type fuel amount control valve 12. The stroke position of the fuel amount control valve 12 is changed according to the duty ratio of a positive supply voltage to a negative supply voltage.

Figure 2:
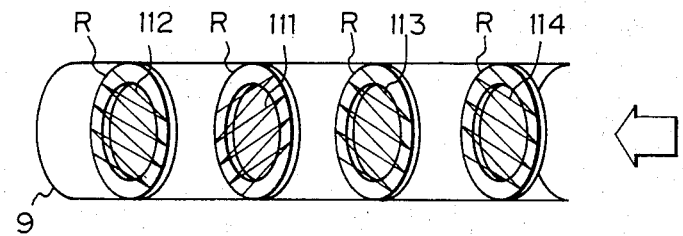
FIG. 2 is a schematic, detailed diagram of the fuel gas flow meter 11 of FIG. 1.
Figure 3:
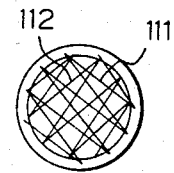
FIG. 3 is a diagram illustrating the relative position between the platinum resistance wire of the electric heater 111 and that of the temperature-dependent resistor 112 of FIG. 2.

The fuel gas flow meter 11 of FIG. 1 is explained with reference to FIG. 2. In the fuel gas flow meter 11, there are provided an electric heater 111, temperature-dependent resistors 112 and 113, and a temperature-compensation resistor 114. Each of the elements 111 through 114 is made of a platinum resistance wire stretched in a lattice form across an insulating ring member R. The temperature-dependent resistor 112 is located on the downstream side of and close to the electric heater 111, the temperature-dependent resistor 113 is located on the upstream side of and close to the electric heater 111, and the temperature-compensation resistor 114 is located on the upstream side of the temperature-dependent resistor 113. Particularly, the platinum resistance wire of the temperature-dependent resistor 112 has the same resistance-temperature characteristics as those of the temperature-dependent resistor 113. In addition, the platinum resistance wire of the temperature-dependent resistor 112 is inclined with respect to that of the electric heater 111, as is shown in FIG. 3, so as to reduce the effect of thermal distribution of the electric heater 111 on the temperature-dependent resistor 112.

The measuring/controlling circuit 10 responds to the signals of the airflow meter 5 and the fuel gas flow meter 11 to control the fuel amount control valve 12. Note that the measuring/controlling circuit 10 also controls the switching valve 7.

Figure 4:
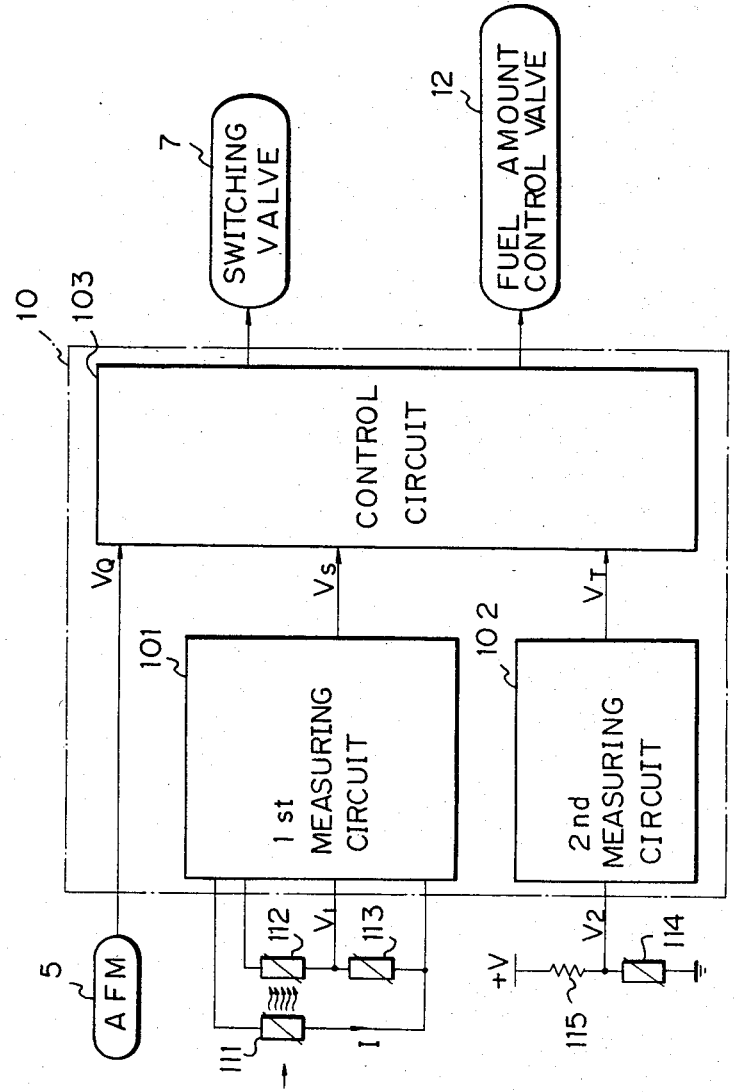
FIG. 4 is a block diagram of the measuring/controlling circuit 10 of FIG. 1.

The measuring/controlling circuit 10 is explained with reference to FIG. 4. In FIG. 4, the measuring/controlling circuit 10 comprises two measuring circuits 101 and 102 and a control circuit 103. The measuring circuit 101 receives the voltage $V_1$ at the intersection of the temperature-dependent resistors 112 and 113 and controls the current I flowing through the electric heater 111. In addition, the measuring circuit 101 generates an analog voltage $V_S$ corresponding to the current I. The measuring circuit 102 receives the voltage $V_2$ at the intersection of the temperature-compensation resistor 114 and a resistor 115 and generates an analog voltage $V_T$ corresponding to the voltage $V_2$. The above-mentioned voltages $V_S$ and $V_T$ are applied to the control circuit 103. Note that the analog voltage $V_Q$ of the airflow meter 5 is applied directly to the control circuit 103.

The control circuit 103 responds to the voltages $V_Q$, $V_S$, and $V_T$ so as to control the fuel amount control valve 12. The control circuit 103 also controls the switching valve 7.

The circuits 101, 102, and 103 are explained in more detail below.

Figure 5:
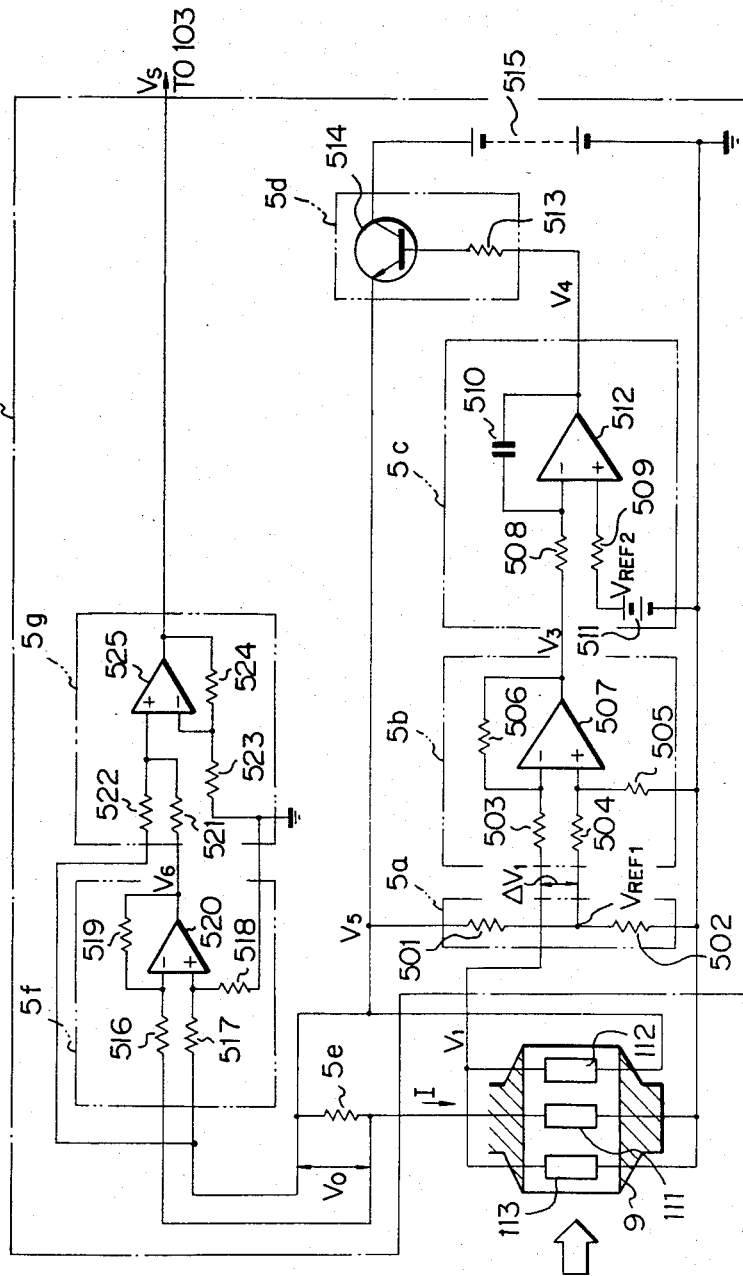
FIG. 5 is a circuit diagram of the first measuring circuit 101 of FIG. 4.

In FIG. 5, which illustrates the first measuring circuit 101 of FIG. 4, the circuit 101 comprises a reference voltage-generating circuit 5a for generating a reference voltage $V_{REF1}$, a first differential amplifier 5b, a second differential amplifier 5c, a power amplifier 5d, an output resistor 5e, a third differential amplifier 5f, and an adder amplifier 5g.

The reference voltage-generating circuit 5a comprises two resistors 501 and 502 in series which, together with the temperature-dependent resistors 112 and 113, constitute a bridge circuit.

The first differential amplifier circuit 5b comprises input resistors 503 and 504, a ground resistor 505, a negative feedback resistor 506, and an operational amplifier 507. The first differential amplifier 5b amplifies the difference $\Delta V_1 (= V_{REF1} - V_1)$ in potential between the diagonal points of the bridge circuit and generates an output voltage $V_3$.

The second differential amplifier 5c comprises input resistors 508 and 509, a capacitor 510, a reference voltage source 511 for generating a reference voltage $V_{REF2}$, and an operational amplifier 512. The second differential amplifier 5c amplifies the difference in potential between the output voltage $V_3$ of the first differential amplifier 5b and the reference voltage $V_{REF2}$ of the reference voltage source 511 and generates an output voltage $V_4$. The capacitor 510 serves to prevent oscillation of the amplifier 5c.

The power amplifier 5d comprises a resistor 513 and a power transistor 514 which is supplied with power by a battery 515. The power amplifier 5d amplifies the output voltage $V_4$ of the second differential amplifier 5c and supplies an output voltage $V_5$ to the bridge circuit and to the electric heater 111.

The output resistor 5e is used to supply the voltage $V_0$ indicating the amount of fuel gas flowing through the fuel gas passage 9 (FIG. 1). The voltage $V_0$ is applied to the third differential amplifier 5f.

The third differential amplifier 5f comprises input resistors 516 and 517, a ground resistor 518, a negative feedback resistor 519, and an operational amplifier 520. The third differential amplifier 5f amplifies the voltage $V_0$ between the terminals of the output resistor 5e and supplies it to the adder amplifier 5g.

The adder amplifier 5g comprises input resistors 521 and 522, a ground resistor 523, a negative feedback resistor 524, and an operational amplifier 525. The input resistor 521 receives the output voltage $V_6$ of the third differential amplifier 5f, and the input resistor 522 receives the voltage $V_5$. The adder amplifier 5g generates an output voltage $V_S$ corresponding to the amount of fuel gas and supplies it to the control circuit 103.

Figure 6:
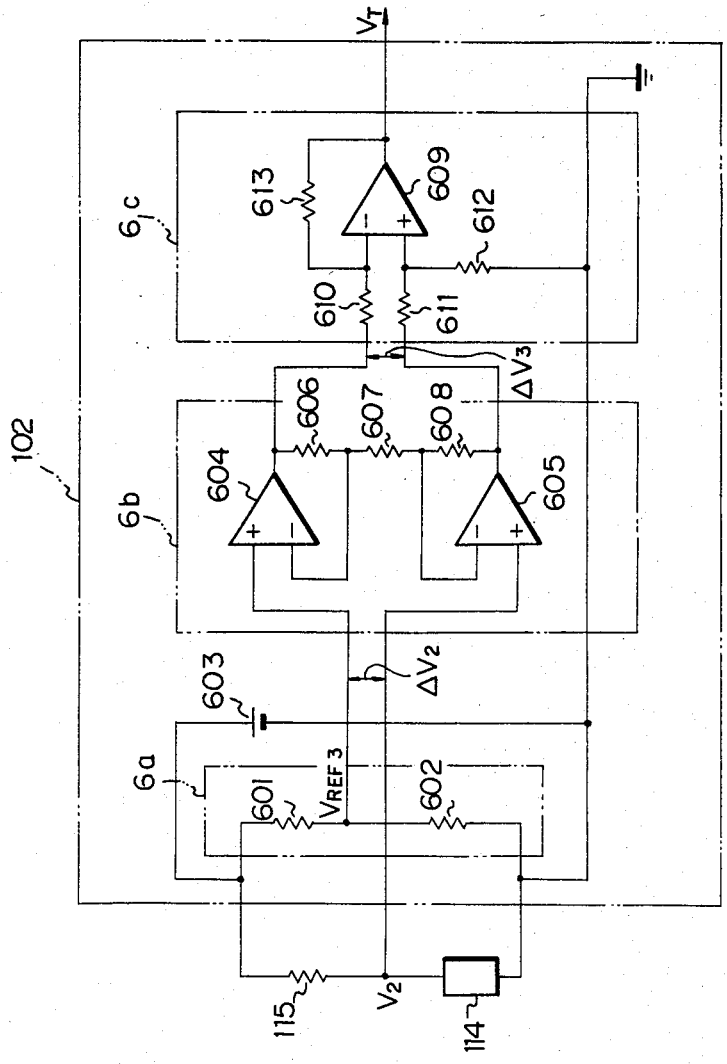
FIG. 6 is a circuit diagram of the second measuring circuit of FIG. 4.

In FIG. 6, which illustrates the second measuring circuit 102 of FIG. 4, the circuit 102 comprises a reference voltage-generating circuit 6a for generating a reference voltage $V_{REF3}$, a first differential amplifier 6b, and a second differential amplifier 6c.

The reference voltage-generating circuit 6a comprises two resistors 601 and 602 in series which, together with the resistor 115 and the temperature-compensation resistor 114 constitute a bridge circuit. The bridge circuit is supplied with power by a power source 603.

The first differential amplifier 6b comprises operational amplifiers 604 and 605 and resistors 606, 607, and 608. The first differential amplifier 6b amplifies the difference $\Delta V_2 (= V_{REF3} - V_2)$ in potential between the diagonal points of the bridge circuit.

The second differential amplifier 6c comprises an operational amplifier 609, input resistors 610 and 611, a ground resistor 612, and a negative feedback resistor 613. The second differential amplifier 6c amplifies the differential $\Delta V_3$ in potential between two outputs of the first differential amplifier 6b and generates an output voltage $V_T$ corresponding to the temperature of the fuel gas flowing through the fuel gas passage 9.

The principle of the fuel gas flow meter 11 is explained with reference to FIGS. 4, 5, and 6 (See U.S. Pat. No. 4,276,773). The voltage $V_5$ applied to the electric heater 111 and the bridge circuit formed by the resistors 112, 113, 501, and 502 is controlled by the differential amplifiers 5b and 5c and the power amplifier 5d so that the voltage $\Delta V_1$ is held constant. In this case, the amount of fuel gas flow G is expressed by $$G = \{K_1/(C_P \Delta V_1)\} \cdot I^n \quad (1)$$

where $K_1$ is a constant;

$C_P$ is the specific heat at a constant pressure of the fuel gas;

I is the current flowing through the electric heater 111; and n is a constant which equals a value of from 2 to 3.

In addition, the specific heat $C_P$ is dependent upon the temperature of the fuel gas, i.e., the output voltage $V_T$ of the first measuring circuit 101. That is, $$C_P = f_1(V_T) \quad (2)$$

Further, since the voltage $V_0$ is proportional to the current I (FIG. 5) and the voltage $V_S$ is dependent upon the voltage $V_0$, the current I is expressed by $$I = K_2 V_S \quad (3)$$

Therefore, the equation (1) can be replaced by $$G = K_2 f_1(V_T) \cdot \{f_2(V_S)\}^n \qquad (4)$$

Thus, the amount of fuel gas flow can be calculated according to the outputs $V_S$ and $V_T$ of the measuring circuits 101 and 102.

The control circuit 103 of FIG. 4 is explained with reference to FIG. 7. The control circuit 103 comprises an A/D converter 700 incorporating a multiplexer, a microcomputer, or a central processing unit (CPU) 720, a clock circuit 730, a comparator 740, a driver circuit 750 for driving the fuel amount control valve 12, and a driver circuit 760 for driving the switching valve 7.

The elements 700, 720, 730, 740, and 750 of the control circuit 103 will be explained in more detail.

Figure 7:
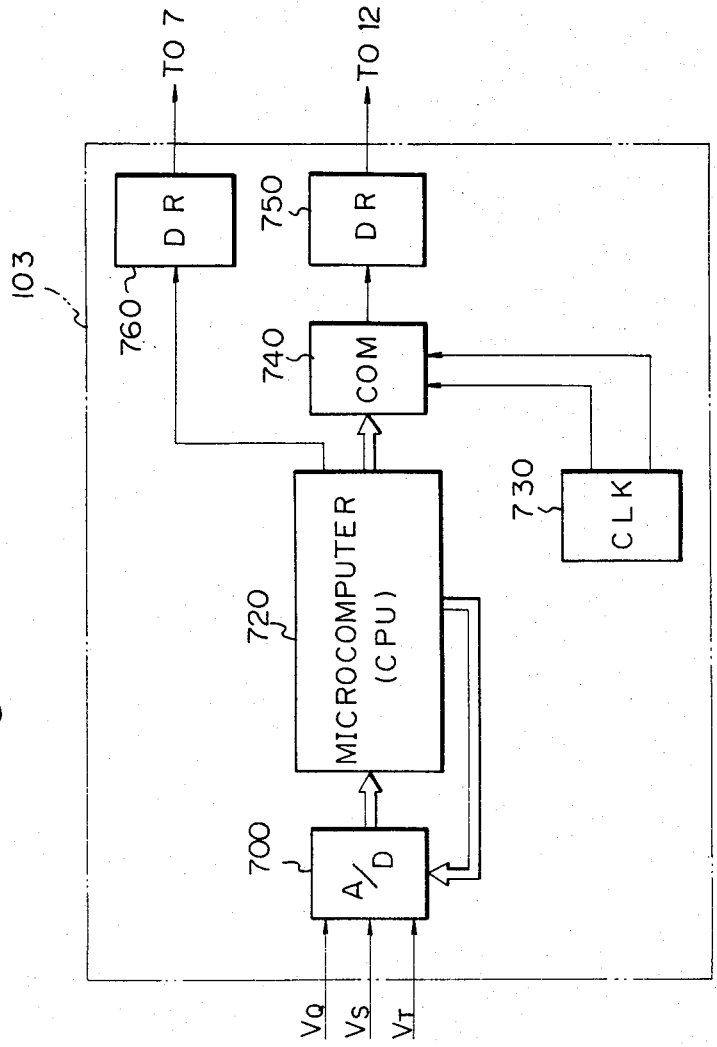
FIG. 7 is a detailed block diagram of the control circuit 103 of FIG. 4.
Figure 8:
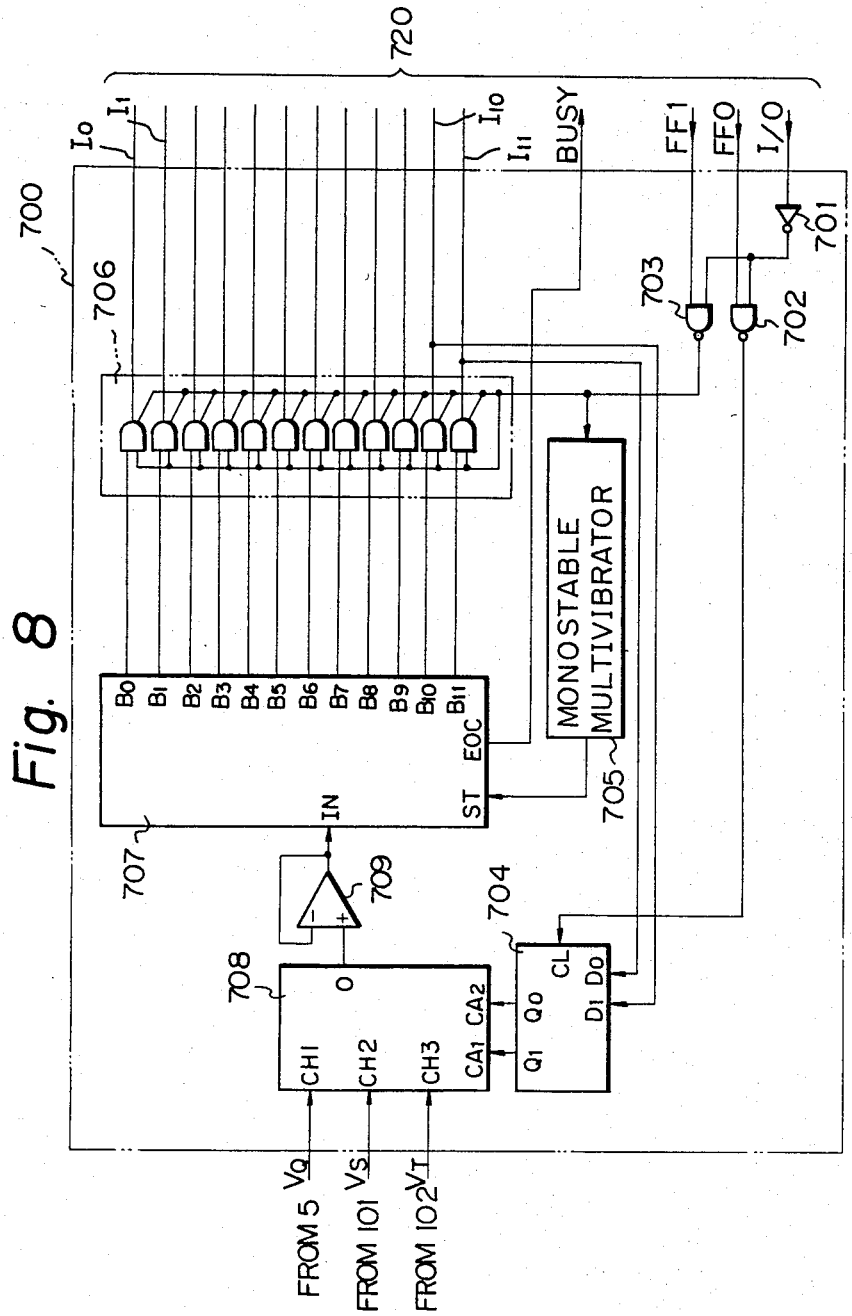
FIG. 8 is a circuit diagram of the analog/digital (A/D) converter 700 of FIG. 7.

In FIG. 8, which illustrates the A/D converter 700 of FIG. 7, an input/output (I/O) signal is supplied from the CPU 720 to an inverter 701 which is connected to an input of a NAND gate 702 and to an input of a NAND gate 703. First and second device selection signals FF0 and FF1 are supplied from the CPU 720 to the other inputs of the NAND gates 702 and 703, respectively. The output of the NAND gate 702 is connected to a clock input CL of a memory unit 704 (for example, RCA's CD4035) and the output of the NAND gate 703 is connected to a monostable multivibrator 705 and to an input of a three-state buffer 706 such as Toshiba's TC5012. When the monostable multivibrator 705 is triggered by the output of the NAND 703, the monostable multivibrator 705 generates a pulse having a duration of 20 $\mu$s, and the pulse is transmitted to a start input ST of a successive-approximation A/D converter 707, such as Burr-Brown's ADC80AG-12. An end-of-conversion (EOC) terminal of the A/D converter 707 is connected to a BUSY terminal of the CPU 720. That is, when the potential at the BUSY terminal of the CPU 720 is high, the CPU 720 stops operating. Reference symbols, $I_1, I_2, \ldots I_{11}$ designate bus lines connected to the CPU 720. The bus lines $I_{10}$ and $I_{11}$ are connected to data inputs $D_0$ and $D_1$ of the memory unit 704, which has outputs $Q_0$ and $Q_1$ which are connected to select inputs $CA_1$ and $CA_2$, respectively, of a multiplexer 708, such as Intersil's MVD409. The multiplexer 708 has channels CH1, CH2, and CH3 which receive the output voltage $V_Q$ of the airflow meter 5, the output voltage $V_S$ of the first measuring circuit 101, and the output voltage $V_T$ of the second measuring circuit 102, respectively, and has an output O which is connected, via a buffer amplifier 709, to an input IN of the A/D converter 707. Outputs $B_0$ through $B_{11}$ of the A/D converter 707 are connected via the three-state buffer 706, to the bus lines $I_0, I_1, \ldots, I_{11}$, respectively.

The operation of the A/D converter 700 is now explained. First, the CPU 720 generates "0" as the channel select value to each of the bus-lines $I_{10}$ and $I_{11}$. Next, when the I/O signal and the FF1 signal are caused to be "1" and the FF0 signal is caused to be "0" so as to change the output of the NAND gate 702 from "1" to "0", the memory unit 704 takes the data "00" of the bus lines $I_{10}$ and $I_{11}$ and transmits it to the multiplexer 708. In a case where the select inputs $CA_1$ and $CA_2$ are "0" and "0", respectively, the multiplexer 708 takes the voltage $V_Q$ from the channel CH1 thereof. Note that when the select inputs $CA_1$ and $CA_2$ are "0" and "1", respectively, the multiplexer 708 takes the voltage $V_S$ from the channel CH2 thereof and that when the select inputs $CA_1$ an $CA_2$ are "1" and "0", respectively, the multiplexer 708 takes the voltage $V_T$ from the channel CH3 thereof. The output of the multiplexer 708 is supplied to the buffer amplifier 709, in which an impedance conversion is carried out, and is then transmitted to the A/D converter 707. Next, when the FF1 signal is changed from "1" to "0" and the I/O signal is changed from "1" to "0" so as to change the output of the NAND gate 703 from "1" to "0", the monostable multivibrator 705 generates a pulse having a duration of 20 $\mu$s so that the A/D converter 707 initiates the carrying out of an A/D conversion operation. While the A/D converter 707 is carrying out such an operation, it generates "1" from the EOC terminal thereof so that the CPU 720 stops operating. When the above-mentioned A/D convertion operation is completed, the EOC terminal of the A/D converter 707 is changed from "1" to "0", and the CPU 720 again assumes an operating state. Since the output of the NAND gate 703 is "0", the outputs $B_0$ through $B_{11}$ of the A/D converter 707 are transmitted, via the three-state buffer 706, to the bus lines $I_0$ through $I_{11}$, respectively. Therefore, when the EOC terminal of the A/D converter 707 is changed from "1" to "0", the CPU 720 reads at the bus lines $I_0$ through $I_{11}$ transmitted from the three-state buffer 706.

Then the FF1 signal is caused to be "0" and the FF0 signal is caused to be "1". In addition, the I/O signal is caused to be "1" and, simultaneously, the bus lines $I_{10}$ and $I_{11}$ are caused to be "0" and "1", respectively. Next, the above-mentioned operation is repeated so as to perform an A/D conversion upon the voltage $V_S$ applied to the channel CH2 of the multiplexer 708. Similarly, an A/D conversion is performed upon the voltage $V_T$ applied to the channel CH3 of the multiplexer 708.

The CPU 720 is actually only one element of a microcomputer which also comprises a read-only memory (ROM) for storing programs and constants, a random-across memory (RAM), and the like. However, the ROM, the RAM, and the like are omitted in the drawings in order to simplify the description of the microcomputer. Toshiba's TLCS-12A can be used as the CPU, the detailed structure of which is well known and is therefore omitted here.

Figure 9:
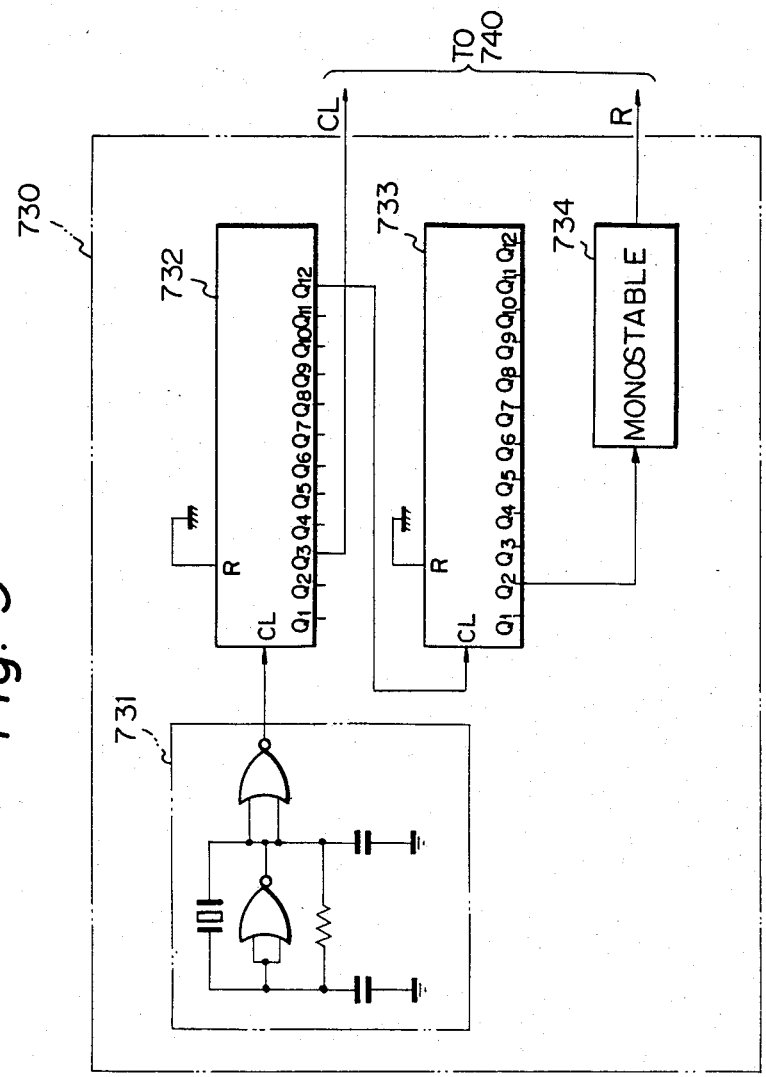
FIG. 9 is a circuit diagram of the clock circuit 730 of FIG. 7.

In FIG. 9, which illustrates the clock circuit 730 of FIG. 7, reference numeral 731 designates a crystal oscillating circuit for generating a reference signal having a frequency of 2,097,152 Hz. Reference numerals 732 and 733 designate 12-stage binary counters, such as RCA's CD4040. The counter 732 generates a clock signal CL having a frequency of 262,144 Hz (=2,097,152/8) from the terminal $Q_3$ thereof. The terminal $Q_{12}$ of the counter 732 is connected to a clock input of the counter 733. In addition, the terminal $Q_2$ of the counter 733 is connected to a monostable multivibrator 734 which generates a reset signal R having a constant time duration, i.e., 5 $\mu$s, and a frequency of 128 Hz.

Figure 10:
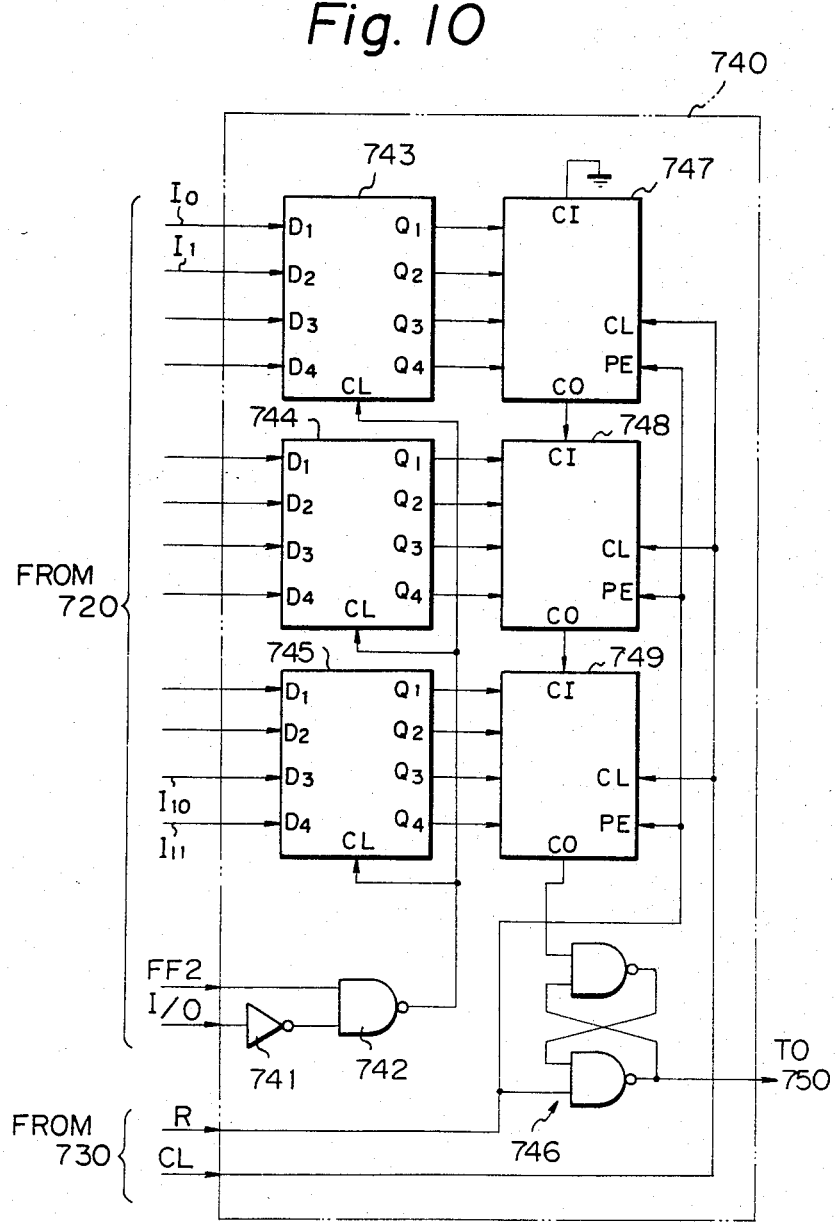
FIG. 10 is a circuit diagram of the comparator 740 of FIG. 7.

In FIG. 10, which illustrates the comparator 740 of FIG. 7, the computer 740 comprises an inverter 741, a NAND gate 742, memory units 743, 744, and 745, an R-S flip-flop 746 formed by two NAND gates, and down counters 747, 748, and 749, such as RCA's CD4049. The I/O signal of the CPU (of the microcomputer) 720 is supplied, via the inverter 741, to the NAND gate 742, and a device select signal FF2 of the CPU is supplied directly to the NAND gate 742. Therefore, when the I/O signal is caused to be "0" and the FF2 signal is caused to be "1", so as to change the output of the NAND gate 742 from "0" to "1", data is transmitted from the CPU to the comparator 740. That is, the data is stored in the memory units 743, 744, and 745 since "0" is applied to each clock terminal CL thereof. On the other hand, the reset signal R of the clock circuit 730 resets the R-S flip-flop 746 and simultaneously presets the down counters 747, 748, and 749 with the outputs of the memory units 743, 744, and 745, respectively. As a result, the down counter 747 initiates counting of the clock signal CL of the clock circuit 730. When the value of the down counter 747 becomes zero, the counter 747 generates a signal from the carry-out terminal CO thereof and transmits it to the carry-in terminal CI of the down counter 748. As a result, the down counter 748 initiates counting of the clock signal CL of the clock circuit 730. When the value of the down counter 748 becomes zero, the counter 748 generates a signal from the terminal CO thereof and transmits it to the terminal CI of the down counter 749. As a result, the down counter 749 initiates counting of the clock signal CL of the clock circuit 730. Finally, when the value of the down counter 749 becomes zero, the counter 749 generates a signal from the CO terminal thereof and transmits it to the R-S flip-flop 746. As a result, the R-S flip-flop 746 is set. If the time duration from the time when the R-S flip-flop 746 is reset to the time when the R-S flip-flop 746 is set is defined as T $\mu$s, the duty ratio is T/5, where 5 $\mu$s is the time-period of the reset signal R.

Figure 11:
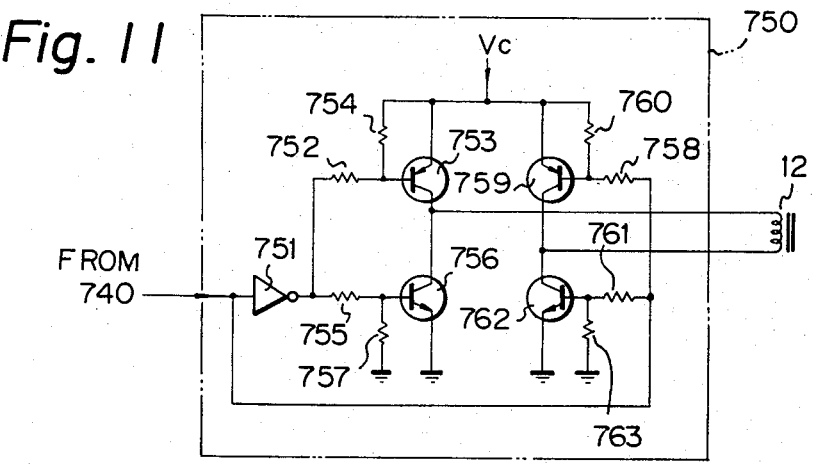
FIG. 11 is a circuit diagram of the driver circuit 750 of FIG. 7.

In FIG. 11, which illustrates the driver circuit 750 of FIG. 7, the driver circuit 750 comprises an inverter 751, transistors 753, 756, 759, and 762, and resistors 752, 754, 755, 757, 758, 760, 761, and 763. The transistors 753 and 759 are of a PNP type, and the transistors 756 and 762 are of an NPN type. These transistors form a bridge circuit.

When the output of the comparator 740 is "1", the transistors 762 and 753 are turned on so that the coil of the fuel amount control valve 12 is applied with a positive-direction current. On the other hand, when the output of the comparator 740 is "0", the transistors 756 and 759 are turned on so that the coil of the fuel amount control valve 12 is supplied with a negative-direction current. The opening of the control valve 12 is changed according to the ratio of the time duration of the positive current to that of the negative current. For example, when the ratio is large, the opening of the control valve 12 is large, and when the ratio is small, the opening of the control/valve 12 is small.

The driver circuit 760 is also controlled by the CPU 720. In this case, the CPU 720 monitors the on- and off-state of an ignition switch (not shown) or the like. For example, when the ignition switch is turned on, the CPU 720 energizes the driver circuit 760 so that the switching valve 7 (FIG. 1) is opened. Contrary to this, when the ignition switch is turned off, the CPU 720 de-energizes the driver circuit 760 so that the switching valve 7 is closed.

Figure 12:
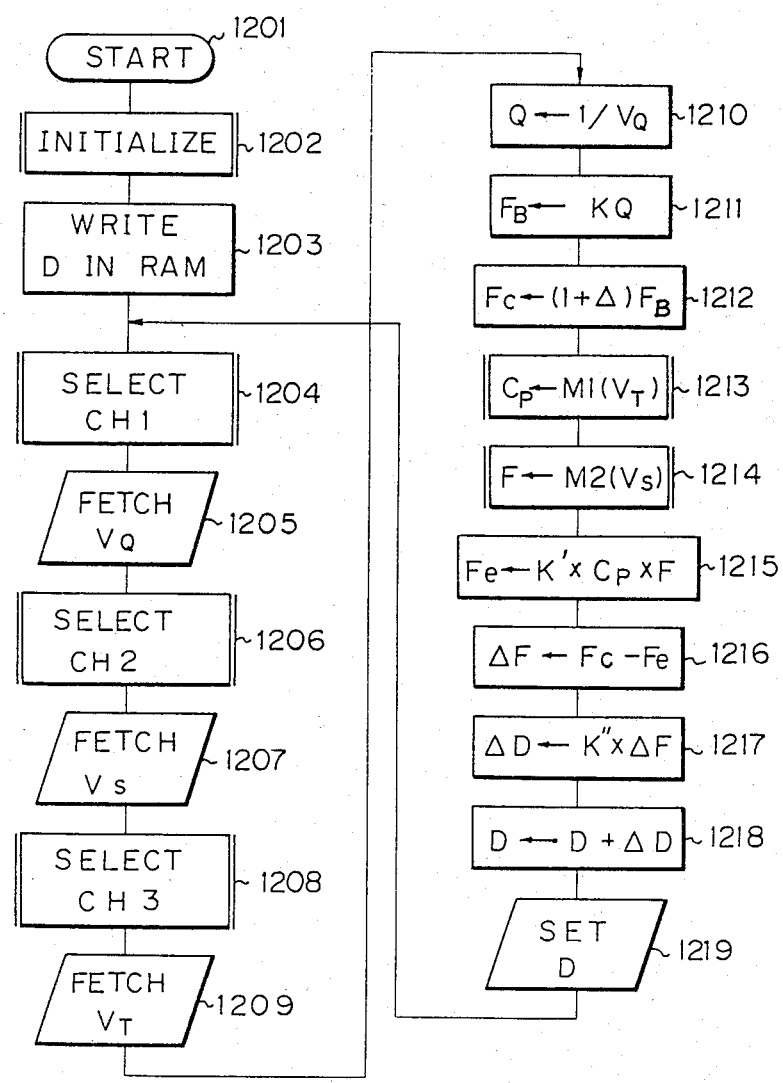
FIG. 12 is a flow chart showing the operation of the control circuit 103 of FIG. 7.

The operation of the CPU 720, as well as the overall operation of the control circuit 103 of FIG. 7, is now explained with reference to FIG. 12. When a key switch, i.e., an ignition switch (not shown), is turned on, the main routine as is illustrated in FIG. 12 is started by step 1201. Next, at step 1202, an initializing routine clears the contents of the RAM, and at step 1203, the CPU 720 sets an initial value of the opening data D of the control valve 12 in the RAM. This initial value is used in step 1218. Note that such initialization steps 1202 and 1203 are performed only once after the ignition switch is turned on, after which a battery is connected to the control circuit 103.

At step 1204, the CPU 720 selects the channel CH1 of the multiplexer 708 so as to cause the A/D converter 707 to perform an A/D conversion upon the voltage $V_Q$ of the airflow meter 5. Then at step 1205, the CPU 720 fetches the voltage $V_Q$.

At step 1206, the CPU 720 selects the channel CH2 of the multiplexer 708 so as to cause the A/D converter 707 to perform an A/D conversion upon the voltage $V_S$ of the first measuring circuit 101. Then at step 1207, the CPU 720 fetches the voltage $V_S$.

At step 1208, the CPU 720 selects the channel CH3 of the multiplexer 708 so as to cause the A/D converter 707 to perform an A/D conversion upon the voltage $V_T$ of the second measuring circuit 102. Then at step 1209, the CPU 720 fetches the voltage $V_T$.

Next, at step 1210, the CPU 720 calculates a quantity Q in proportion to the intake air amount according to the following: $Q \leftarrow 1/V_Q$. Then at step 1211, the CPU 720 calculates a basic desired fuel amount $F_{eB}$ according to the value Q. That is, $F_B \leftarrow KQ$, where K is a constant. In addition, at step 1212, the CPU 720 compensates the basic desired fuel amount $F_B$ by using other operating parameters. That is, $$F_C \leftarrow (1+\Delta)F_B$$

where $\Delta$ is determined by the other operating parameters, such as the engine temperature, the engine acceleration, and the like.

At step 1213, the CPU 720 calculates the specific heat $C_P$, based upon a one-dimensional map M1, in accordance with the voltage $V_T$ (See equation [2]).

At step 1214, the CPU 720 performs a linearizing operation upon the voltage $V_S$, based upon a one-dimensional map M2. That is, the term $F = \{f_2(V_S)\}^n$ in the equation (4) is calculated. For example, if $f(V_S) = V_S$ and $n = 3$, then $$\{f_2(V_S)\}^n = V_S^3.$$

At step 1215, the CPU 720 calculates the actual fuel amount Fe flowing through the fuel gas passage 9 according to the following:

$$F \leftarrow K' \times C_P \times F$$

where K' is a constant. This corresponds to the above-mentioned equation (4).

At step 1216, the CPU 720 calculates the difference $\Delta F$ between the desired fuel amount Fc obtained at step 1212 and the actual fuel amount Fe obtained at step 1215. Then at step 1217, the CPU 720 calculates the opening data $\Delta D$ of the control valve 12 corresponding to the value $\Delta F$ by multiplying K" (constant) by $\Delta F$. At step 1218, the CPU 720 calculates $D \leftarrow D + \Delta D$.

Finally, at step 1219, the CPU 720 sets the value D in the memory units 743, 744, and 745 of the comparator 740 (FIG. 10), thereby returning the control flow to step 1204.

The above-mentioned steps are repeatedly carried out so that the actual fuel amount Fe is close to the desired fuel amount Fc.

Note that the value K at step 1211 can be arbitrarily set, and, accordingly, the air-fuel ratio of the air-fuel mixture can be arbitrarily controlled so as to satisfy the operating condition of the engine.

Figure 13:
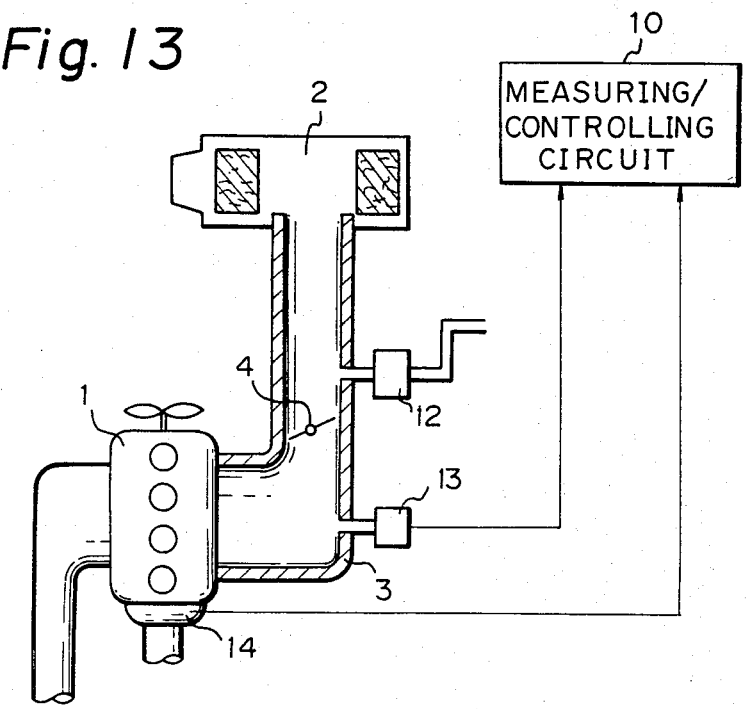
FIGS. 13 through 14 and 16 are schematic diagrams illustrating other embodiments of the fuel supply control for an internal-combustion engine according to the present invention.

In FIG. 13, which illustrates another embodiment of the present invention, a negative-pressure sensor 13 on the downstream side of the throttle valve 4 and a rotational crank sensor 14 for detecting the rotational speed of the engine 1 are provided instead of the airflow meter 5 of FIG. 1. In this case, the intake air amount Q can be detected from the data P of the negative-pressure sensor 13 and the rotational speed data N of the rotational crank sensor 14.

Figure 14:
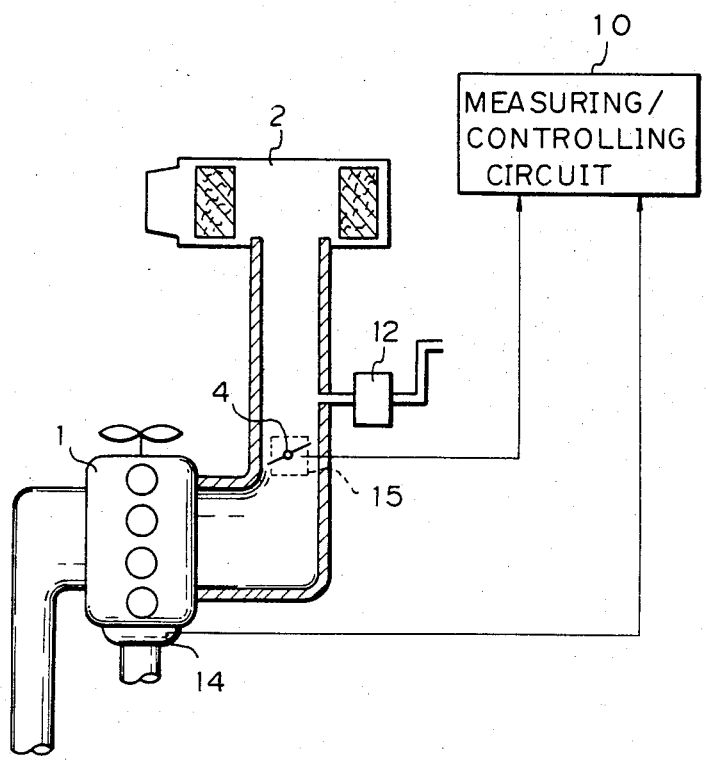

In addition, as is illustrated in FIG. 14, the intake air amount Q can also be detected from the throttle opening data Θ of a throttle sensor 15 and the rotational speed data N of the rotational speed sensor 14.

Figure 15:
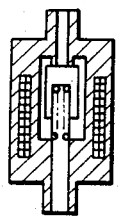
FIG. 15 is a cross-sectional view of another fuel amount control valve of FIG. 1.

Further, an electromagnetic valve as is illustrated in FIG. 15 can be used instead of the linear solenoid type of control valve 12 of FIG. 1.

Figure 16:
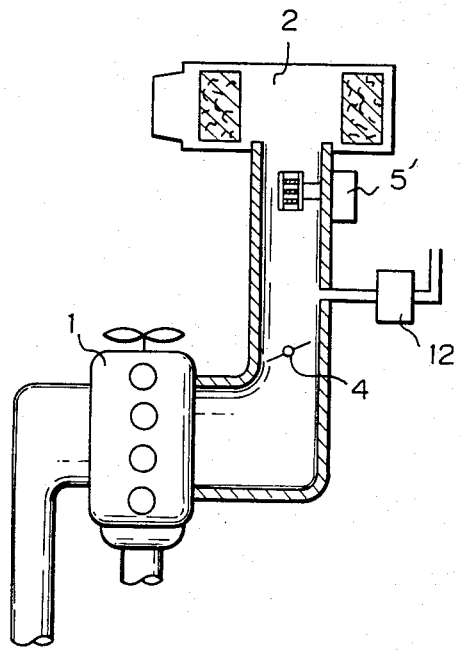

Also, as is illustrated in FIG. 16, an airflow meter 5' of the same type as the fuel gas flow meter 11 can be used. In this case, since both of the meters 5' and 11 have the same output characteristics and the same response characteristics, the operation of the CPU can be simplified. In addition, the intake air amount $V_Q$ of the airflow meter 5' can be used directly for controlling the control valve 12 without performing an A/D conversion upon the voltage $V_Q$. Further, since both of the meters 5' and 11 operate as mass flow meters, no temperature, pressure, etc. corrections are necessary, and, accordingly, no sensors for such corrections are necessary.

We claim:

1. A fuel supply control apparatus for an internal-combustion engine having a fuel gas passage leading to an intake air passage, comprising:

a means for vaporizing liquid fuel and supplying vaporized fuel to said fuel gas passage;

a means for detecting the actual mass flow rate of said vaporized fuel flowing through said fuel gas passage said actual mass flow rate detecting means being provided in said fuel gas passage downstream of said liquid fuel vaporizing means;

a means for detecting the load of said engine;

a means for calculating the mass flow rate of fuel in accordance with the detected load of said engine; and a means for controlling feedback of fuel to be supplied to said engine so that the detected actual mass flow rate of said vaporized fuel is close to the calculated mass flow rate of fuel.

2. An apparatus as set forth in claim 1, wherein mass fuel flow rate detecting means comprises a hot-wire fuel gas flow meter.

3. An apparatus as set forth in claim 1 or 2, wherein said load detecting means comprises a means for detecting the rate of air flowing through said intake air passage.

4. An apparatus as set forth in claim 3, wherein said airflow rate detecting means comprises a hot-wire airflow meter of the same type as that of said fuel flow rate detecting means.

5. An apparatus as set forth in claim 1, wherein said load detecting means comprises:

a means for detecting the negative pressure of said intake air passage; and a means for detecting the rotational speed of said engine.

6. An apparatus as set forth in claim 1, wherein said load detecting means comprises:

a means for detecting the opening of a throttle valve positioned within said intake air passage; and a means for detecting the rotational speed of said engine.

* * * * *